July 30, 1968 E. ZUMMERMANN 3,394,504
METHOD FOR PRODUCING AN INSULATING BODY
FOR DIP-SOLDER CONNECTIONS
Filed March 17, 1965

United States Patent Office 3,394,504
Patented July 30, 1968

3,394,504

METHOD FOR PRODUCING AN INSULATING BODY FOR DIP-SOLDER CONNECTIONS

Ernst Zimmermann, Stuttgart-Feuerbach, Germany, assignor to International Standard Electric Corporation, New York, N.Y., a corporation of Delaware Filed Mar. 17, 1965, Ser. No. 440,469
Claims priority, application Germany, Mar. 21, 1964, St. 21,870
7 Claims. (Cl. 51—317)

ABSTRACT OF THE DISCLOSURE

A method for reducing the adhesion of solder to non-conductive surfaces in printed circuits. Printed circuit boards normally have a distinct skin resulting from pressure applied during their manufacture. This skin provides insulation and will usually be left intact. However, it has been found that solder adheres to the skin during dip-soldering causing a breakdown in resistance between conductors on the board. This invention concerns a method for removing the skin and thus reducing resistance loss due to adhesion of solder where it is not wanted.

The present invention relates to a method for providing and maintaining improved insulating properties between conductors on a supporting body made of insulating material and particularly for maintaining insulating characteristics in the areas between conductors during dip-soldering.

Insulating material bodies may be pressed plastic plates which bear on their surface a conductor arrangement, a printed circuit, or the like. Such circuit plates are frequently exposed to a dip-soldering bath, after completion of the conductor arrangement in order to coat the conductor arrangement with a soldering layer, which will simplify the following soldering-in of the electric or electronic components.

It has been revealed that the surface of plastic material conventionally used for such plates, e.g. epoxy resin with glass fiber insertions, shows a property, after the pressing process used in manufacturing, which easily leads to the attachment of soldering particles to the conductor-free surfaces, during the dip-soldering treatment. This generally causes an inadmissible reduction in the insulating properties of spaces between adjacent conductor sections and may even cause direct short-circuits.

It is, therefore, an object of the invention to provide a supporting body of plastic material on the surface of which metallized sections adhere to solder and non-metallized sections of the surface exhibit reduced adhesion to solder in a soldering bath. The present solution for this problem is substantially characterized in this that the surface limiting layer, having occurred during the final shaping of the insulating body, is removed by suitable removal of surface material. The effect of the changed surface property is particularly surprising in that removal of a microscopic thickness of the layer, producing practically no change in the size and the rigidity is sufficient to obtain the desired reduction in adhesion.

To remove the surface layer, treatment with a solvent or an etching method can be considered, depending on the insulating material used. Certain intricate processes can be avoided according to an embodiment of the invention involving insulating bodies of epoxy-artificial resin with glass fiber insertions. It has been found, that in such a case the surface structure, obtained during shaping (pressing skin) may be mechanically removed to produce the desired effect.

This mechanical surface removal can be carried out by applying known precision abrasion involving vibration of a dry abrasive. This method is of particular interest for insulating material with a comparatively soft surface property, as for example epoxy-artificial resin as compared with Bakelite material, since the abrasive attacks slowly compared with uncontrollable sand-blasting. This makes it possible to remove the undesired surface part easily and uniformly. This is essential, because on one hand incomplete removal of the highly compressed surface skin offers no security against adhesion of soldering particles, and on the other hand too deep a removal of the surface layer causes, besides a reduced rigidity and particularly reduced alternate bending rigidity, a reduced resistance against the influence of climate and moisture. The alternating bending rigidity must be considered particularly with insulating parts which are used as supporting elements in plug strips and the like.

Maintenance of the aforementioned limits can be assured according to an embodiment of the invention when applying precision abrasion on insulating bodies, made of epoxy-artificial resin, in that a sharp-etched quartz sand with a granulation of at least 0.2 mm. and a maximum of 0.7 mm. is used and the number of effective vibrations for one treatment is at least $6\times10^4$ with a maximum of $1.3\times10^5$. Such insulating bodies in the shape of a plate are frequently provided with glass fiber insertions and serve as support for printed circuits. The small conductor distances of such wafers, particularly at the terminals to knife blade strips of plug-in units require that adherent soldering particles be avoided and permit, on the other hand, due to the thinness of the wafers no perceivable removal of material.

Further deviations in applying precision abrasion result from the vibration speed. For the treatment of epoxy-artificial resins the most effective vibrations are between 1200 and 1600 per minute as an optimum to obtain a soldering resistant surface which is, however, insensitive against grooves and against moisture.

If less stringent requirements for surface quality are permissible, the effective period for abrading can be reduced to provide more economical production. The method according to the invention can be varied by use of an abrasive including a mixture of grinding material and pumice-powder. The grinding material can be for example cubes of solid wax or the like with a length of 5–15 mm.

To remove residues after grinding, it is recommended, according to an embodiment of the invention, to provide a finishing treatment. Therefore, the wafers are treated, after precision abrading, with loose material of a porous property. To this end de-resined beech-wood chips are very favorable since they have proper absorbability and adhesion for fine-granulated grinding materials and, moreover, provide a high degree of cleanliness for the insulating body's surface. The latter property is particularly important, if, following grinding a galvanic treatment or the like is provided.

The invention is further explained with the aid of examples shown on the accompanying drawing, wherein.

Figure 1:
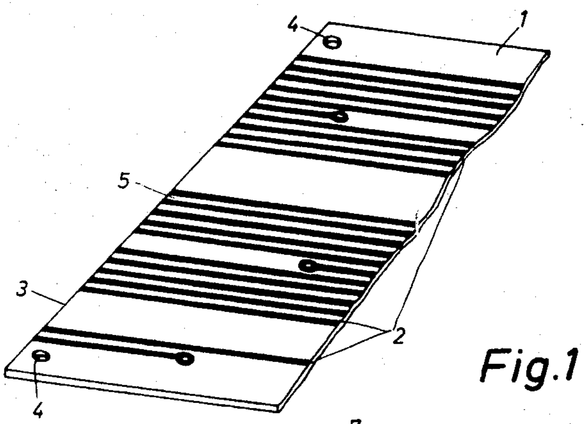
FIG. 1 shows a part of an insulating wafer with printed circuits.

The wafer according to FIG. 1 consists of an insulating body 1, e.g. an epoxy resin wafer with glass fiber insertions, and applied metallic conductors 2. The edge 3 of the wafer is provided with drill holes 4 to connect to a contact spring strip, so that the wafer may be conventionally inserted into the socket portion of a plugging unit. The terminal conductor leads run a short distance, whence in case of dip soldering treatment soldering particles remaining adhesive in the intermediate spaces 5 on the insulating body surface may cause short-circuits. This can be avoided according to the invention by removing the dense, hard surface coat which occurs when pressing an epoxy resin wafer.

Figure 2:
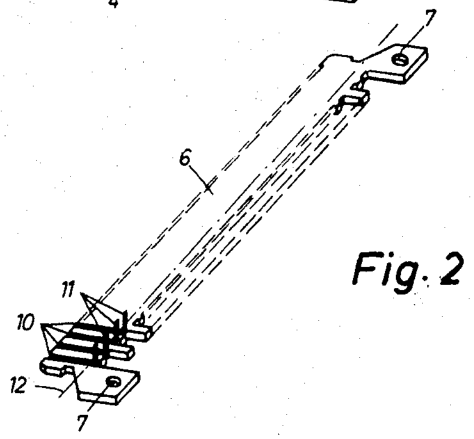
FIG. 2 shows a contact knife blade strip for an electric connection.

The same applies for the insulating body 6 of the contact knife blade strip, shown in FIG. 2, which is mounted with suitable drill holes 7 to the wafer according to FIG. 1.

Figure 4:
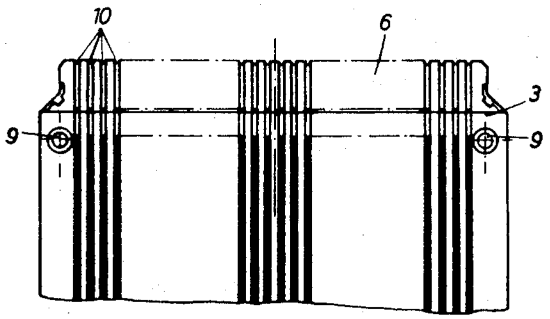
FIG. 3 and FIG. 4 show mounting of the knife blade strip to one edge of a wafer according to FIG. 1 in top view and in a side view, respectively.
Figure 3:
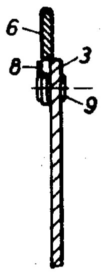

FIGS. 3 and 4 show the knife blade strip mounted to an insulating board by means of a clamping metal sheet 8 and hollow rivets 9. The strip-shaped contacting elements 10 placed in notches of the insulating body 6 have on the side facing the wafer soldering lugs 11. The knife blade strip is exposed in a soldering bath after applying a contact strip, from the wafer side up to approximately the indicated line 12, whereby also the corresponding edge of the insulating body is wetted with soldering material. Here too, the possibility of short-circuits exists between adjacent contacts by soldering particles adhering to the insulating body, which is avoided by removing the surface skin. The illustrated contact knife blade strip represents an example of the importance of removing the surface material, because here considerable alternating bending stresses at the insulating body may occur, for the bearing of which surface quality is of importance.

While the principles of the invention have been described above in connection with specific methods, it is to be understood that this description is made only by way of example and not as a limitation on the scope of the invention.

What is claimed is:

1. A method for manufacturing an insulating body having a surface to which solder adheres, including metallic sections and sections having a top coat surface between the metallic sections, said method comprising:

abrading the sections having a top coat surface to remove solder adherent surfaces, in which said abrading involves vibrations of an abrasive material into contact with the top coat surface.

2. A method as claimed in claim 1, in which the surface is abraded by precision abrading using dry granulated grinding means as an abrasive.

3. A method as claimed in claim 2, in which the abrasive consists of sharp-edged quartz sand having a granulation of at least 0.2 mm. and at most 0.7 mm., and the abrading continues through at least $6 \times 10^4$ vibrations of the sand and no more than $1.3 \times 10^5$ vibrations.

4. A method as claimed in claim 3, in which the number of vibrations is between 1200 and 1600 per minute.

5. A method as claimed in claim 2, in which abrading is performed with a mixture of grinding bodies and pumice powder.

6. A method as claimed in claim 3, including further treatment with loose material having porous and adhesive properties.

7. A method as claimed in claim 6, in which further treatment is by use of de-resined beechwood chips.

References Cited

UNITED STATES PATENTS 2,876,601 3/1959 McFaddan ---------- 51—321

FOREIGN PATENTS 659,176 3/1963 Canada.

LESTER M. SWINGLE, *Primary Examiner.*